United States Patent
Goodson et al.

(10) Patent No.: US 10,608,940 B2
(45) Date of Patent: Mar. 31, 2020

(54) SYSTEMS AND METHODS FOR ALLOCATING NETWORK BANDWIDTH ACROSS ACCESS MODULES

(71) Applicants: Richard Goodson, Huntsville, AL (US); Ramya Raghavendra, Huntsville, AL (US); Kenneth D. Ko, Clearwater, FL (US)

(72) Inventors: Richard Goodson, Huntsville, AL (US); Ramya Raghavendra, Huntsville, AL (US); Kenneth D. Ko, Clearwater, FL (US)

(73) Assignee: ADTRAN, Inc., Huntsville, AL (US)

( * ) Notice: Subject to any disclaimer, the term of this patent is extended or adjusted under 35 U.S.C. 154(b) by 132 days.

(21) Appl. No.: 14/823,898

(22) Filed: Aug. 11, 2015

(65) Prior Publication Data

US 2015/0350083 A1 Dec. 3, 2015

Related U.S. Application Data

(63) Continuation-in-part of application No. 14/706,732, filed on May 7, 2015, now Pat. No. 9,729,241.
(Continued)

(51) Int. Cl.
*H04L 12/801* (2013.01)
*H04L 12/26* (2006.01)
(Continued)

(52) U.S. Cl.
CPC .......... *H04L 47/12* (2013.01); *H04B 10/272* (2013.01); *H04L 12/287* (2013.01);
(Continued)

(58) Field of Classification Search
None
See application file for complete search history.

(56) References Cited

U.S. PATENT DOCUMENTS 7,061,861 B1 6/2006 Mekkittikul
7,298,973 B2 11/2007 Ovadia et al.
(Continued)

FOREIGN PATENT DOCUMENTS

WO 2013/173665 A1 11/2013

OTHER PUBLICATIONS

"Technical Report DSL Forum TR-059, DSL Evolution—Architecture Requirements for the Support of QoS—Enabled IP Services," Digital Subscriber Line Forum, Sep. 2003.

*Primary Examiner* — Nicholas Sloms
(74) *Attorney, Agent, or Firm* — Maynard Cooper & Gale, P.C.; Jon E. Holland

(57) ABSTRACT

A telecommunication system uses a dynamic bandwidth allocation (DBA) algorithm based on current load conditions for controlling transmissions to a plurality of access modules of an access node in order to achieve a fair allocation of network bandwidth at the access node. As an example, access modules at an access node communicate via a control channel with dynamic bandwidth allocation (DBA) logic that receives load information from each of the access modules. Using such load information, the DBA logic dynamically controls the upstream data rates so that a fair allocation of network bandwidth is achieved across all of the access modules. Specifically, the data rates are controlled such that packet flows for services of the same class achieve the same or similar performance (e.g., average data rate) regardless of which access module is receiving each respective packet flow.

14 Claims, 8 Drawing Sheets

Related U.S. Application Data

(60) Provisional application No. 61/990,039, filed on May 7, 2014.

(51) Int. Cl.
  *H04L 12/911* (2013.01)
  *H04L 12/64* (2006.01)
  *H04L 12/28* (2006.01)
  *H04B 10/272* (2013.01)

(52) U.S. Cl.
  CPC ........ *H04L 12/6418* (2013.01); *H04L 43/026* (2013.01); *H04L 47/783* (2013.01)

(56) References Cited

U.S. PATENT DOCUMENTS

| | | |
|---|---|---|
| 7,606,154 B1 | 10/2009 | Lee |
| 7,660,251 B2 | 2/2010 | Grosbach et al. |
| 8,437,355 B1 | 5/2013 | Goodson |
| 8,705,567 B2 | 4/2014 | Denney |
| 8,797,844 B1 | 8/2014 | Strahle |
| 8,902,777 B1 | 12/2014 | Huang |
| 8,937,865 B1 | 1/2015 | Kumar |
| 9,729,241 B2 | 8/2017 | Goodson et al. |
| 2002/0138561 A1 | 9/2002 | Chatfield |
| 2002/0138643 A1 | 9/2002 | Shin |
| 2003/0165148 A1 | 9/2003 | Bishard |
| 2005/0071504 A1 | 3/2005 | Handlogten et al. |
| 2007/0133989 A1 | 6/2007 | Kim et al. |
| 2007/0248109 A1 | 10/2007 | DeCarolis et al. |
| 2008/0049615 A1 | 2/2008 | Bugenhagen |
| 2009/0103545 A1 | 4/2009 | Anschutz et al. |
| 2009/0109846 A1 | 4/2009 | Sinha |
| 2010/0008379 A1 | 1/2010 | Yoo et al. |
| 2011/0182588 A1* | 7/2011 | Wojtowicz ............. H04B 10/40 398/139 |
| 2012/0039173 A1 | 2/2012 | Danzig |
| 2012/0127975 A1 | 5/2012 | Yang |
| 2012/0321315 A1 | 12/2012 | Timm |
| 2013/0304915 A1 | 11/2013 | Kawai |
| 2014/0092738 A1 | 4/2014 | Grandhi |
| 2014/0126907 A1* | 5/2014 | Hirth ................. H04Q 11/0062 398/58 |
| 2014/0185451 A1 | 7/2014 | Yip |
| 2015/0229430 A1* | 8/2015 | Liang ................. H04L 14/0242 398/68 |
| 2015/0326337 A1* | 11/2015 | Yoshida ................. H04L 12/44 398/48 |

* cited by examiner

SYSTEMS AND METHODS FOR ALLOCATING NETWORK BANDWIDTH ACROSS ACCESS MODULES

CROSS REFERENCE TO RELATED APPLICATION

This application is a continuation-in-part of U.S. patent application Ser. No. 14/706,732, entitled "Telecommunication Systems and Methods Using Dynamic Shaping for Allocating Network Bandwidth" and filed on May 7, 2015, which is incorporated herein by reference. U.S. patent application Ser. No. 14/706,732 claims priority to U.S. Provisional Patent Application No. 61/990,039, entitled "Systems and Methods for Scheduling Business and Residential Services in Optical Networks" and filed on May 7, 2014, which is incorporated herein by reference.

RELATED ART

Telephony networks are typically designed to provide a variety of services, such as telephone, Internet, and television services. Packet flows associated with the services may be grouped into classes, and the classes may be assigned priorities and weights. At various points in the network, congestion may occur such that the requested traffic or "load" exceeds the capacity of the network at that point. Schedulers and shapers are often used in order to allocate the network bandwidth among the competing services based on the priorities and weights that are assigned to the packet flows.

As network demand and size increase, it becomes more difficult to design and implement a network that ensures fair allocation of network bandwidth at various points in the network so that services of the same class achieve the same or similar performance across a range of customers. As an example, an access node is typically at an edge of a network where packet flows are demultiplexed in the downstream direction and multiplexed in the upstream direction. Such an access node may have several access modules inserted into and held by a chassis, and each access module may provide services to a large number of customers. It is often the case that some packet flows achieve a significantly different level of performance than other packet flows of the same class depending on the overall configuration of the network and the current load conditions.

Techniques for reducing such disparities, thereby achieving a more fair allocation of network bandwidth, without significantly increasing the cost or complexity of the network are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to telecommunication systems that use a dynamic bandwidth allocation (DBA) algorithm based on current load conditions for controlling transmissions to a plurality of access modules of an access node in order to achieve a fair allocation of network bandwidth at the access node. In one exemplary embodiment, access modules at an access node communicate via a control channel with dynamic bandwidth allocation (DBA) logic that receives load information from each of the access modules. Using such load information, the DBA logic dynamically controls the upstream data rates so that a fair allocation of network bandwidth is achieved across all of the access modules. Specifically, the data rates are controlled such that packet flows for services of the same class achieve the same or similar performance (e.g., average data rate) regardless of which access module is receiving each respective packet flow.

Figure 1:
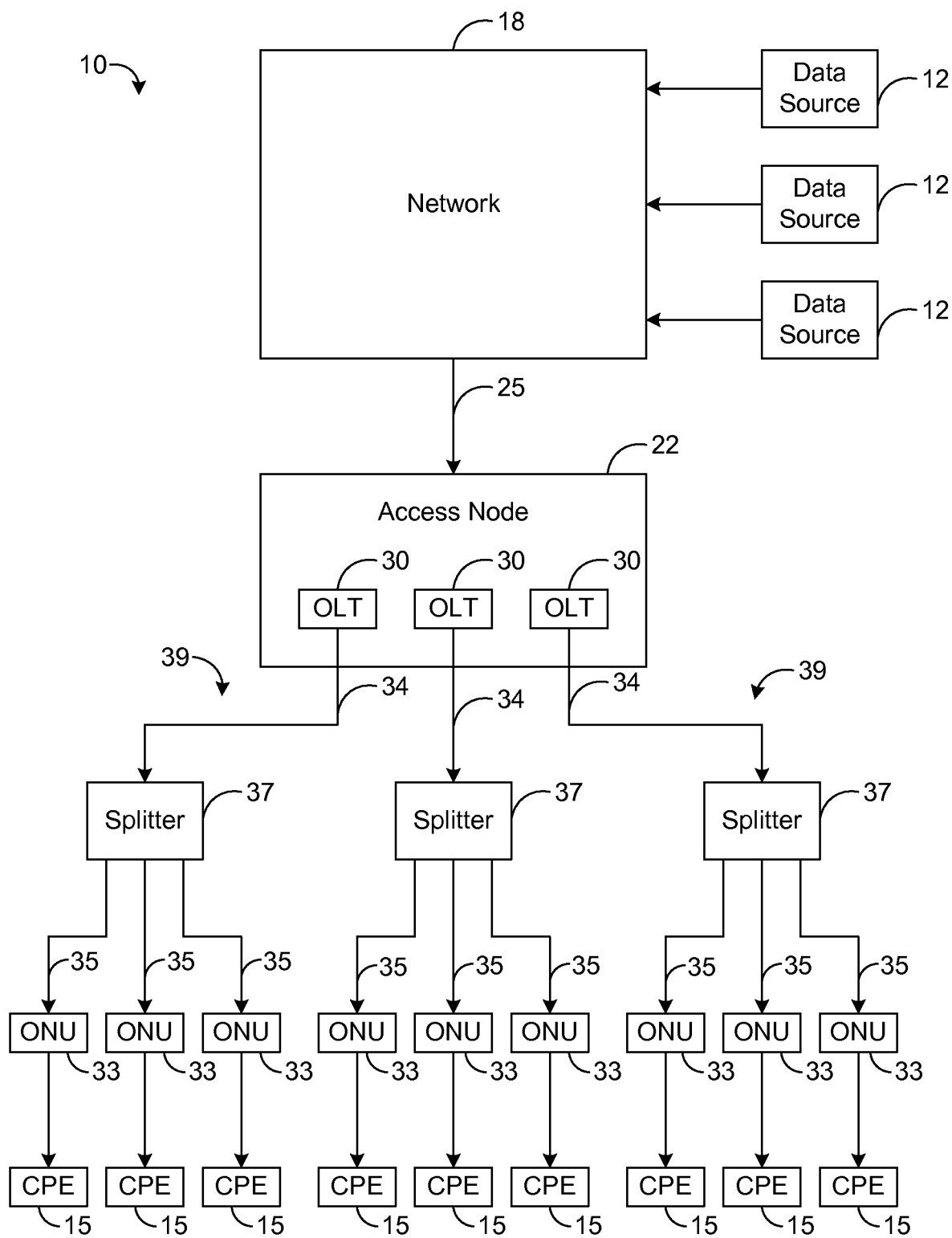
FIG. 1 is a block diagram illustrating an exemplary embodiment of a telecommunication system.

FIG. 1 depicts an exemplary embodiment of a telecommunication system 10 for communicating data from a plurality of data sources 12 to customer premises equipment (CPE) 15 at locations (e.g., customer premises) remote from the data sources 12. In this regard, each data source 12 is coupled to at least one network 18, which can comprise any of various types of networks, such as the public switched telephone network (PSTN), local area networks (LANs), wide area networks (WANs), cellular networks, or the Internet. Note that FIG. 1 shows three data sources 12 for simplicity of illustration, but the system 10 may have any number of data sources 12 and CPE 15.

The network 18 is coupled to an access node 22 via a network connection 25. In one exemplary embodiment, the network connection 25 comprises an optical fiber, and the network 18 multiplexes the data streams from multiple data sources 12 into a single data stream for communication across the connection 25. In other embodiments, other types and numbers of network connections may be used for communication between the access node 22 and the network 18. As an example, it is possible for the network connection 25 to be implemented by multiple twisted-wire pairs that are bonded in order to carry a high-speed data stream to the access node 22.

In the downstream direction, the access node 22 is configured to demultiplex the data stream received from the connection 25, thereby separating the data stream into a plurality of demultiplexed packet flows where each packet flow includes packets for a respective service. In this regard, customers subscribe for services, such as Internet service, telephone service, and television service, and each downstream packet flow within the access node 22 generally corresponds to and defines downstream data for a respective service for a respective customer. The packet flows are switched within the access node 22, as will be described in more detail below, such that each packet flow is forwarded to its destination CPE 15.

In this regard, the access node 22 has a plurality of transceivers 30, which in the embodiment shown by FIG. 1 are optical line terminals (OLTs) 30 for communicating optical signals. In other embodiments other types of transceivers are possible, including transceivers for communicating electrical signals, such as digital subscriber line (DSL) transceivers.

Referring to FIG. 1, each OLT 30 is coupled to a respective set of optical network units (ONUs) 33 via a plurality of communication connections 34, 35, which in the embodiment shown by FIG. 1 are optical fibers. In this regard, each optical fiber 34 is coupled to a respective optical splitter 37 that splits signals from the access node 22 across a plurality of optical fibers 35. Each ONU 33 is at a remote location from the access node 22 and is configured to receive at least one packet flow from the access node 22. Each ONU 33 converts the received packet flows from the optical domain to the electrical domain. Each OLT 30 and the optical components coupled to it, including the optical splitter 37, ONUs 33, and optical fibers 34, 35 form a passive optical network (PON) 39 for communicating the packet flows via optical signals. In other embodiments, other types of optical channels and non-optical channels may be used to communicate the packet flows between the access node 22 and the CPE 15.

For simplicity of illustration, FIG. 1 depicts only downstream communications, but it is possible for the CPE 15 to transmit upstream data to the access node 22 and network 18, as will be described in more detail hereafter. In addition, FIG. 1 shows three PONs 39 for simplicity of illustration. However, there may be any number of PONs 39, and each PON 39 may have any number of optical components, such as ONUs 33. Indeed, as will be described in more detail hereafter, the access node 22 may have several access modules (not shown in FIG. 1), and any access module may be coupled to and service any number of PONs 39.

Figure 2:
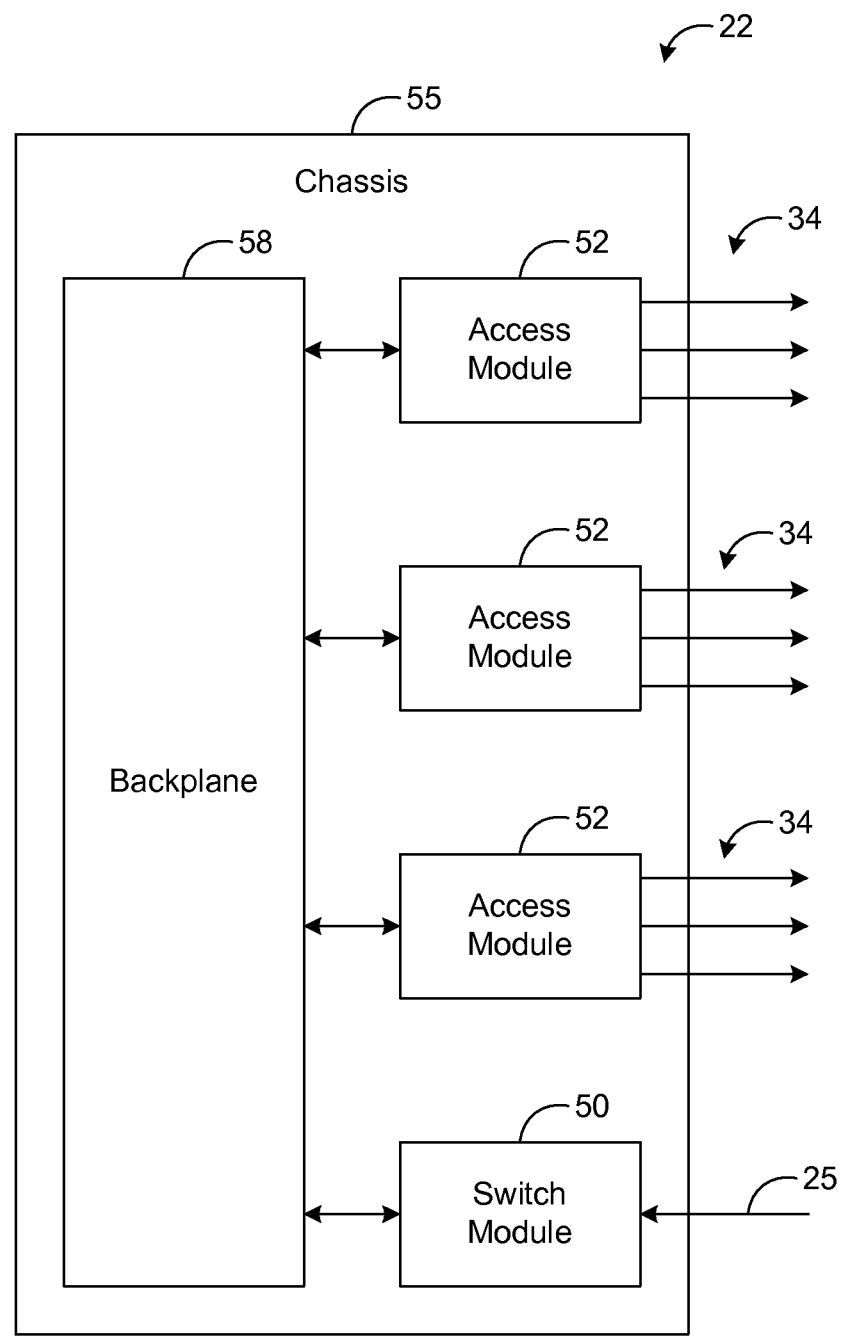
FIG. 2 is a block diagram illustrating an exemplary embodiment of an access node, such as is depicted by FIG. 1.

FIG. 2 depicts an exemplary embodiment of the access node 22. As shown by FIG. 2, the access node 22 comprises a switch module 50 that is coupled to the network connection 25, and the access node 22 also comprises a plurality of access modules 52 that are coupled to optical fibers 34 for communication with the ONUs 33 (FIG. 1). In one exemplary embodiment, each module 50 and 52 is inserted into a respective slot of a chassis 55 at a network facility, such as a central office, or at an intermediate point between a central office and customer premises. As shown by FIG. 2, the chassis 55 has an electrical or optical backplane that electrically or optically couples the access modules 52 to the switch module 50 and to each other. In this regard, any module 50 or 52 may communicate electrical or optical signals with any other module 50 or 52 via the backplane 58. In one exemplary embodiment, backplane implements a star-type switching fabric where the switch modules 50 communicates directly with the access modules 52, and the access modules 52 may communicate with one another through the switch module 50. However, other types of switching fabrics are possible in other embodiments. Note that FIG. 2 shows three access modules 52 and one switch module 50 for simplicity of illustration, but the access node 22 may have any number of access modules 52 or switch modules 50 in other embodiments.

In the downstream direction, the switch module 50 is configured to receive a high-speed data stream from the network 18 (FIG. 1) via the network connection 25. The switch module 50 is configured to demultiplex this high-speed data stream to recover the individual packet flows to be communicated to the CPE 15. The switch module 50 transmits these packet flows across the backplane 50 to the access modules 52 based on their destinations. Specifically, for a given packet flow, the switch module 50 transmits the packet flow to the access module 52 coupled to the CPE 15 that is to receive the packet flow. Such access module 52 converts the packet flow from the electrical domain to the optical domain and then transmits the packet flow across the appropriate optical fiber 34 for reception by the flow's destination CPE 15.

In the upstream direction, the switch module is configured to receive upstream packet flows received from the CPE 15 and multiplex these flows into a high-speed data stream for transmission of such data stream across the network connection 25 to the network 18.

Figure 3:
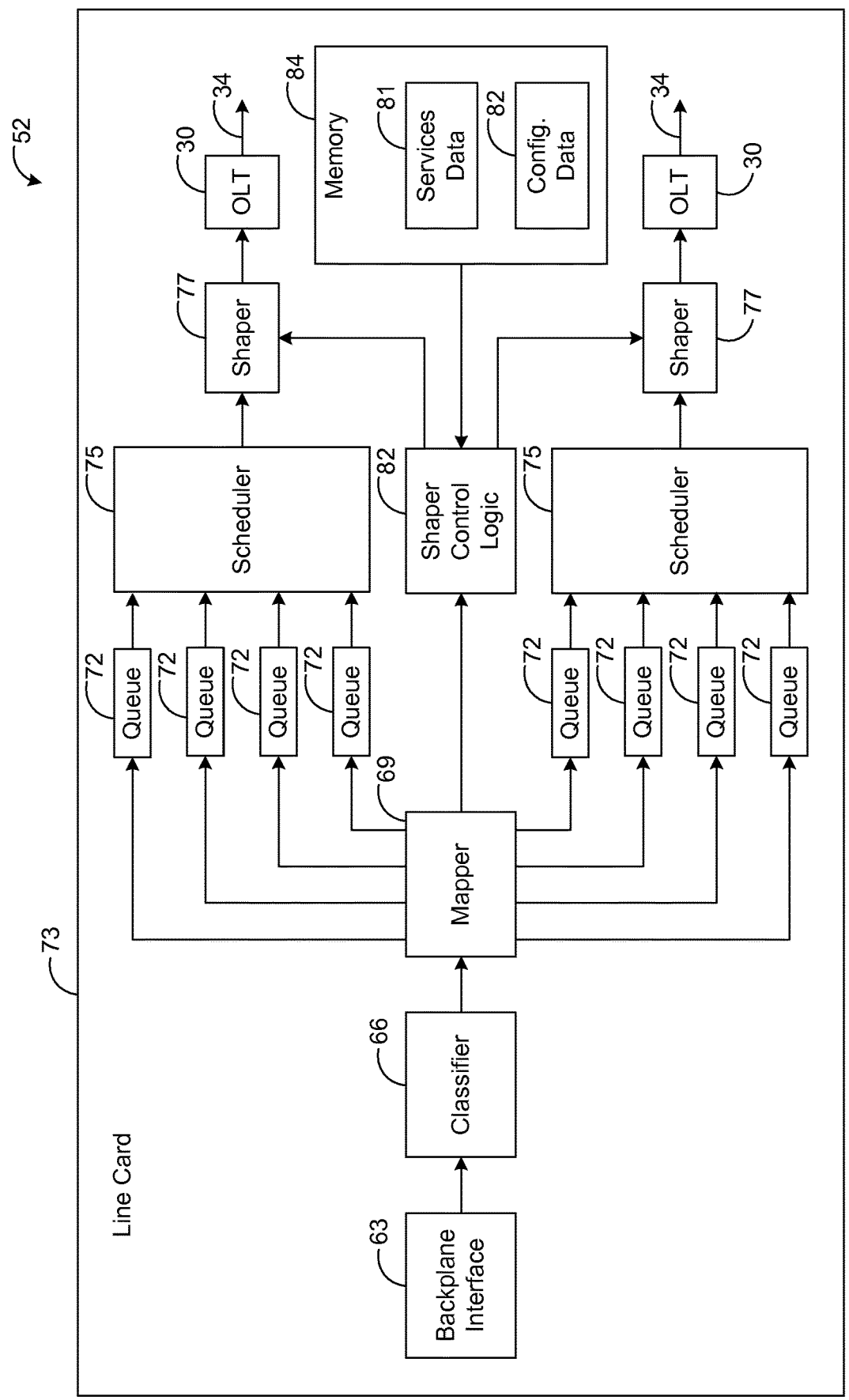
FIG. 3 is a block diagram illustrating an exemplary embodiment of an access module, such as is depicted by FIG. 2, configured for downstream communication.

FIG. 3 depicts an exemplary embodiment of an access module 52. As shown by FIG. 3, the access module 52 has a backplane interface 63 that couples the access module 52 to the chassis backplane 58 (FIG. 2). The backplane interface 63 is coupled to a classifier 66 that receives data packets from the switch module 50 (FIG. 2) and classifies such packets. In this regard, as indicated above, the traffic may be associated with different services, and each packet may be classified based on service types or other classification parameters.

The classifier 66 is coupled to a mapper 69 that is configured to map each packet to a respective queue 72 based on the packet's classification, as determined by the classifier 66, and the mapper 69 transmits each packet to the queue 72 to which it is mapped. Note that the packets in the same queue 72 have the same classification. In one exemplary embodiment, each queue 72 corresponds to a respective service of a respective customer. That is, all of the packets for a given service of a given customer are mapped to the same queue 72, but other configurations of the queues are possible in other embodiments.

The queues 72 feeding the same OLT 30 and, thus, ultimately the same PON 39 are coupled to a scheduler 75 that pulls packets from the queues 72 according to a desired scheduling algorithm, which takes into account the priorities and weights assigned to the services and, hence, the queues 72 as known in the art. The output of each scheduler 72 is coupled a respective dynamic shaper 77 that is configured to dynamically control (e.g., limit) the rate of packets passing through it, as will be described in more detail hereafter. The output of each shaper 77 is coupled to a respective OLT 30 that converts the data packets from the shaper 77 into the optical domain from the electrical domain for communication across a respective PON 39 (FIG. 1). Note that all of the components of the access module 52 reside on a printed circuit board (PCB) 73, referred to as a "line card." In other embodiments, other configurations of the access module 52 are possible.

Figure 4:
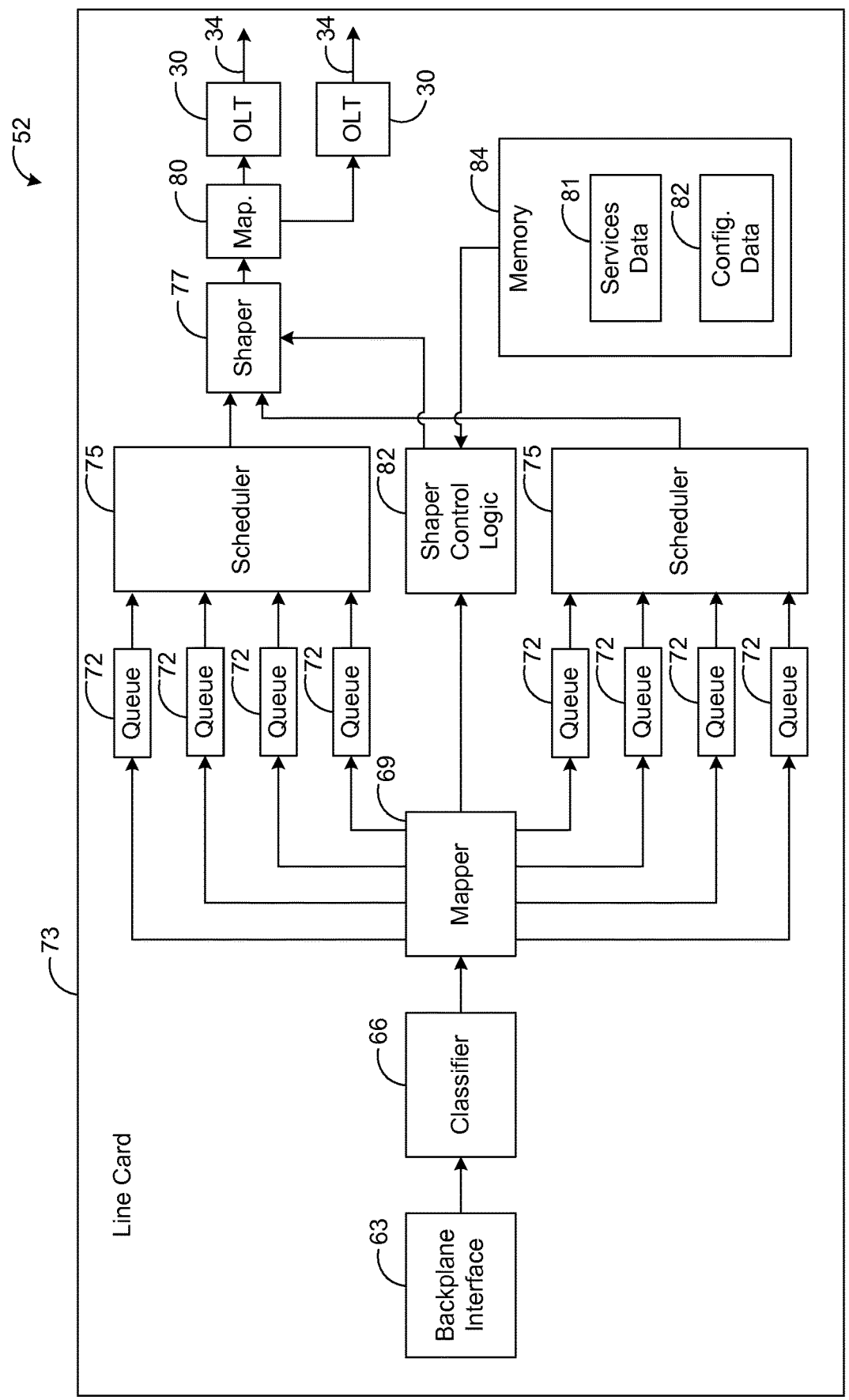
FIG. 4 is a block diagram illustrating another exemplary embodiment of an access module, such as is depicted by FIG. 2, configured to downstream communication.

As an example, as shown by FIG. 4, a scheduler 72 may span across multiple OLTs 30 rather than a single OLT 30, as shown by FIG. 3, such that the scheduler 72 is scheduling traffic for multiple PONs 39. In such case, a single dynamic shaper 77 may limit the rate for all of the PONs 39 served by the scheduler 72, with each packet mapped to the correct OLT 30 by a mapper 80 upon egress from the dynamic shaper 77.

Note that the scheduling hierarchy for a given scheduler 75 may be defined such that the flows from a group of queues 72 for a given user are scheduled. Alternatively, a group of users may be associated with the same queue 72 and, hence, the same service. In addition, as described above, a scheduler 75 may also be configured to schedule traffic for a single PON 37 or, alternatively, a set of PONs 37.

As shown by FIGS. 3 and 4, an access module 52 may comprise shaper control logic 82 that is configured to dynamically control each shaper 77, as will be described in more detail hereafter. In one exemplary embodiment, the shaper control logic 82 is implemented in hardware, such as a field programmable gate array (FPGA). In other embodiments, the shaper control logic 82 may be implemented in hardware, software, firmware, or any combination thereof. As an example, the shaper control logic 82 may be implemented in software that is stored in and executed by a processor (not shown).

The shaper control logic 82 is configured to communicate control information with other access modules 52 across the switching fabric provided by the backplane 58 via a control channel. Specifically, the control logic 82 communicates with the other access modules 52 to discover the traffic load conditions currently at each module 52, referred to as "load information." As an example, the load information may include an estimate of the data rate for the flow of data currently passing through each queue. Such data rate may be estimated based on the amount of data stored in each queue or the amount of data that has recently passed through the queue. In one embodiment, for each queue, the load information indicates the maximum of (1) a data rate that would be required to communicate all of the data currently in the queue over a predefined time period and (2) a data rate measured or otherwise determined for the queue over a recent time interval. In other embodiments, other types of load information are possible.

In one exemplary embodiment, the load information from a given access module 52 is aggregated on a per class-of-service (CoS) basis. That is, for each class of service, the shaper control logic 82 calculates a value indicative of the total amount of data that the access module 52 is currently attempting to communicate (e.g., queued or ingressing to the access module 52 for that class of service). Such information may be determined from the amount of data currently in or passing through the queues associated with such class of service, as described above. In some cases, the aggregated amount may be limited based on predefined constraints (e.g., burst size or rate limitations) associated with the class of service to ensure that the class of service is not oversubscribed with bandwidth. In other embodiments, it is unnecessary for the load information to be aggregated, and other types of aggregation are possible. As an example, rather than sending aggregated load information indicating the loading for each class of service across all PONs serviced by a given access module 52, the load information may be provided on a per-PON basis, or some other basis, indicating the loading for each respective PON serviced by the access module 52.

After receiving current load information for each access module 52, the control logic 82 sets the rate of each dynamic shaper 77 of its access module 52 according to a desired DBA algorithm based on the load information of all of the access modules 52 participating in the DBA algorithm. Each dynamic shaper 77 remains at its updated rate for a given time period, until the control logic 82 receives new loading information from each access module 52 in order to perform another shaper update. Thus, the shaper rates are repetitively updated from time-to-time in order to accommodate changing traffic load conditions. Each access module 52 uses similar techniques to appropriately control its shapers 77 over time in order to implement a desired DBA algorithm that fairly allocates available downstream bandwidth at the access node 22 among the shapers 77, as will be described in more detail hereafter.

In this regard, there may be times when the sum of the loads from data sources 12 exceeds the capacity of the network connection 25. In such case, if shapers 77 are not used to limit the output rates of the access modules 52, packets may be dropped at the network 18. In one exemplary embodiment, the access modules 52, under the control of the shaper control logic 82, are configured to control the rates of the shapers 77 so that the aggregate downstream capacity of all of the access modules 52 is just under the maximum downstream capacity of the connection 25. Thus, packets should be dropped at the access node 22 before a bottleneck develops at the network connection 25, thereby preventing uncontrolled packet loss in the network 18 that would otherwise result from the limited bandwidth associated with the network connection 25. Specifically, as will be described in more detail below, according to certain protocols, loss of packets in an access module 52 is reported as feedback to the data sources 12, which are responsive to such feedback for controlling their respective data rates. As an example, the data rate of a data source 12 may be reduced in response to an increase in packet loss at an access module 52. By appropriately controlling shaper rates in the access modules 52, uncontrolled packet loss at the network 18 can be prevented.

Note that it is unnecessary for each access module 52 to participate in the DBA algorithm that is being used to dynamically control shaper rates. In such an embodiment, it is possible to employ the DBA algorithm only on the participating access modules 52. As an example, assume that some of the access modules 52, referred to hereafter as "participating modules," are configured to participate in the DBA algorithm by dynamically updating shaper rates and sharing load information, as described herein. Also assume that at least some of the access modules 52, referred to hereafter as "non-participating modules," are not configured to participate in the DBA algorithm and, thus, do not dynamically update shaper rates or share load information. In such embodiment, shaper control logic 82 may be configured to dynamically allocate a fraction of the total capacity of the network connection 25 rather than the entire capacity of such connection 25 such that a sufficient amount of capacity is reserved for the non-participating modules.

As an example, assume that the total capacity of the network connection 25 is 20 Giga-bits-per-second (Gbps). Also assume that there are five non-participating access modules 52 that communicate traffic from the network connection 25 and that the maximum downstream rate for each non-participating access module 52 is 100 Mega-bits-per-second. In such example, a total capacity to be allocated among shapers of the participating access modules 52 may be calculated by reducing the total capacity of the network connection 25 by the total maximum downstream capacity of all of the non-participating access modules 52. Thus, in the instant example, the capacity allocated among the schedulers of the participating access modules is 19.5 Gbps (i.e., 20 Gbps-5*100 Mbps) while 500 Mbps is reserved for the non-participating access modules. In such an embodiment, packet loss in the network 18 should be prevented regardless of the actual data rates and loads of the non-participating access modules, assuming that the downstream data rate for each non-participating access module does not exceed its assumed maximum. In other embodiments, other techniques for determining the amount of capacity to be allocated among the shapers of the participating access modules 52 are possible.

Since the shaper control logic 82 is aware of the load information for each access module 52, the shaping algorithm can take into account imbalances in the load information from one access module 52 to another such that a fair allocation of the bandwidth of the access node 22 is applied across all of the access modules 52. For example, for multiple customers who have subscribed for the same service, the shaper control logic 82 can be configured to control the shaper rates according to the DBA algorithm such that each customer should receive the same or similar performance regardless of which PON 39 is used to provide the service to the customer.

As an example, assume that two access modules 52 support twenty services of the same class, each offering a 1 Gigabit per second (Gbps) load, and the connection 25 supports 10 Gbps. In such case, fair allocation would be for each service to be allocated the same rate or 0.5 Gbps. However, assume that nineteen of the services are provided via one access module 52 and that the remaining service (i.e., the "$20^{th}$" service) is provided via another access module 52. Without chassis-wide fairness where allocation is determined based on the load information of both access modules 52, then the lone service on one of the access modules 42 (i.e., the $20^{th}$ service) would be provided at close to 1 Gbps while the other nineteen services are provided less than 0.5 Gbps each. With chassis-wide fairness, the control logic 82 can determine based on the knowledge of the load information for all 20 services that the shaper rates across multiple access modules 52 should be controlled such that each service is provided at about 0.5 Gbps.

In one exemplary embodiment, DBA is performed periodically. For example, the shaper control logic 82 may control the rates of the shapers 77 to achieve a desired DBA based on the traffic load conditions. Thereafter, as traffic load conditions change, the control logic 82 of one access module 52 may be configured to communicate with the other access modules 52 to discover how the traffic load conditions have changed and to then update the DBA accordingly.

In one exemplary embodiment, the shaper control logic 82 of each access module 52 uses the same DBA algorithm in order to determine the shaper rates for the shapers 77 of its access module 52 (referred to as the shaper control logic's "local" access module) based on the traffic load conditions of all of the access modules 52. Based on the traffic load conditions of its local access module 52, as well as the other access modules 52, the shaper control logic 82 is configured to determine how much of the overall downstream bandwidth available for the access node 22 is to be allocated to its local access module 52 on a per-shaper basis so that the available downstream bandwidth is fairly allocated among the shapers of all of the access modules 52. The shaper control logic 82 then adjusts the shaper rates of the shapers 77 on its local access module 52 according to the determined allocation. By performing such techniques at each access module 52, the allocation of available downstream bandwidth is performed in a fair manner across all access modules 52 such that services of the same class achieve the same or similar performance regardless of which access module 52 handles the packet flows of such services.

The DBA algorithm implemented by the shaper control logic 82 may be based on many factors. In one exemplary embodiment, the DBA algorithm is based on services data 81 and configuration data 82 that are stored in memory 84 of the access module 52. The configuration data 82 is indicative of the configuration and, more specifically, the capacity of the system 10, such as the configuration of the access node 22 and the PONs 39. As an example, for the downstream direction, the configuration data 82 may indicate the number of queues 72, queue size, and classification and mapping parameters for one or more access modules 52. The configuration data 81 may also include configuration information about the PONs 39 serviced by the access module 52, such as the number of OLTs 30 residing on the module 52, the number of ONUs 33 serviced by each OLT 30, and the number and types of services carried by each PON 39. The services data 81 includes parameters indicative of the services associated with one or more access modules 52, such as the guaranteed and peak rates, weight, and priority associated with each service. Note that the services data 81 and configuration data 82 may be provisioned by a technician or otherwise defined prior to operation of the access node 22.

In one exemplary embodiment, the services data 81 and the configuration data 82 indicate detailed information about the resources associated with the same access module 52 on which the data 81, 82 is stored but indicates coarser information for the other access modules in the access node 22. As an example, the services data 81 and the configuration data 82 of a given access module 52 may indicate, respectively, the service level parameters and resource capacity for each packet flow of this access module. However, the services data 81 indicates aggregated parameters on a per class-of-service basis for each of the other access modules 52. For example, for a particular access module 52, the configuration data 82 may indicate the total number of services of a particular class without indicating the number of PONs or without indicating which PON carries which service. Also, the services data 81 may indicate an aggregate performance parameter (e.g., minimum average data rate, maximum data rate, etc.) for a particular class of services without indicating the same parameter for each individual service of that class. In other embodiments, other types of information may be stored in the services data 81 and the configuration data 82. As an example, it is possible for the service data 81 and the configuration data 82 to indicate detailed information about each packet flow passing through the access node 22 regardless of which access module 52 services the flow.

As described above, the DBA algorithm used to control the shapers 77 sets the shaper rates such that that the aggregate downstream data rate of all of the access modules 52 is limited to just below the maximum downstream data rate of the network connection 25 thereby preventing uncontrolled packet loss at the input of the network connection 25 due to congestion. As an example, in one embodiment, the shaper rates are set such that the aggregate downstream data rate through the access node 22 is set to be as high as possible while remaining below the maximum downstream data rate of the network connection 25 within a desired margin of error. Further, the DBA algorithm effectively forces packet losses resulting from congestion into the individual queues 72 so that packet loss can be controlled on a per-queue and, hence, per-service basis where each queue 72 corresponds to a respective service. Accordingly, the data rate for each service can be individually controlled via the DBA algorithm that is implemented by the shaper control logic 82 via the scheduling and the shaping performed by the schedulers 75 and the shapers 77, respectively, of the access modules 52.

In this regard, through transmission control protocol (TCP) or other known protocols, a data source 12 (FIG. 1) controls transmission rates based on feedback indicative of packet loss. As an example, as is known in the art, when a packet is lost, a control message indicative of the packet loss, such as a duplicate Acknowledgement packet, may be transmitted to the data source 12 from which the lost packet originated. Thus, when the rate of a shaper 77 is reduced, more packets are lost in the packet flows passing through the queues 72 feeding the shaper 77 such that the data sources 12 reduce the data rates of these packet flows in response to feedback indicative of an increase in packet loss. Conversely, when the rate of a shaper 77 is increased, less packets are lost in the packet flows passing through the queues 72 feeding the shaper 77 such that the data sources 12 may increase the data rates of these packet flows. Thus, adjusting the rates of the shapers 77 has the effect of adjusting the transmission rates of the packets flows passing through the shapers 77. Accordingly, using the knowledge of the load information for all of the access modules 52, it is possible to control the shapers 77 so that the data rates of the packet flows are controlled in a fair manner so that the customers having similar services receive similar performance.

An exemplary operation and use of the system 10 for establishing the shaper rates for an access module 52, referred to hereafter as "Access Module A," will now be described in more detail below with reference to FIG. 5.

Figure 5:
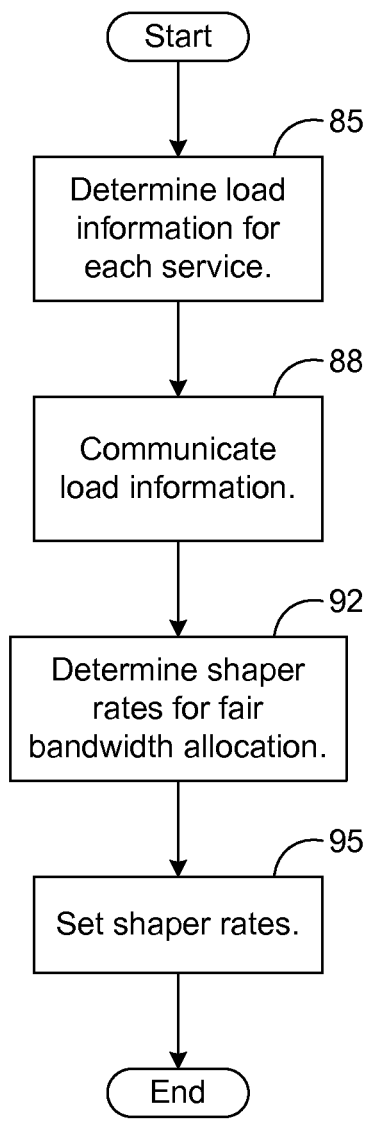
FIG. 5 is a flowchart illustrating an exemplary method for setting shaper rates for controlling downstream bandwidth in a desired manner.

As shown by block 85 of FIG. 5, downstream load information for each service is determined. In this regard, the shaper control logic 82 of Access Module A is configured to determine a value indicative of an amount of downstream data that is currently being communicated for each packet flow that is serviced by Access Module A. As described above, there are various techniques that may be performed to effectuate such an estimate. As an example, the shaper control logic 82 may determine the load conditions based on the amount of data currently stored in or passing through the queues.

In order to reduce the amount of data communicated across the backplane 58, the shaper control logic 82 of Access Module A aggregates the downstream load information of this Access Module A on a per-CoS basis. Thus, for each respective class of service, the shaper control logic 82 calculates an aggregated value indicating the total amount of downstream data that Access Module A is currently communicating for the class of service. When aggregating the downstream load information, the shaper control logic 82 limits the subtotals at appropriate points to the loads that can be carried by each element in the system, such as each PON 39. The shaper control logic 82 of Access Module A transmits this aggregated load information to each of the other access modules 52 via a control channel of the backplane 58, as shown by block 88 of FIG. 5. The shaper control logic 82 of the other access modules 52 similarly determine and distribute across the backplane 58 in block 88 load information that is aggregated on a per-CoS basis so that each access module 52 is aware of the aggregated load information of all of the access modules 52. Thus, the shaper control logic 82 of Access Module A is aware of the downstream load information for each packet flow serviced by Access Module A, as well as the aggregated downstream load information for each of the other access modules 52. That is, for each of the other access modules 52, the shaper control logic 82 is aware of the aggregated amount of downstream data that the access module 52 is currently communicating per class-of-service.

Based on aggregated downstream metrics, such as downstream load information and weights aggregated on a per-CoS basis, the shaper control logic 82 of Access Module A determines a fair allocation of the available downstream bandwidth for each shaper 77 contained within Access Module A, as indicated by block 92 of FIG. 5. Specifically, the control logic 82 determines the shaper rates such that the aggregate downstream data rate through each shaper is limited to that amount allocated to it according to the DBA algorithm. Note that the shaper rate for any of the shapers 77 of Access Module A may be based on a variety of factors, such as the priorities or weights assigned to the packet flows passing through the shapers 77 (as indicated by the services data 81), the amount of data currently communicated for such packet flows, the types of algorithms to be used for handling congestion (as indicated by services data 81), and other information typically used to select desired shaper rates.

After determining the desired shaper rates, the shaper control logic 82 of Access Module A controls the shapers 77, as indicated by block 95 of FIG. 5, in order to implement the determined shaper rates. The shapers 77 operate according to such shaper rates until these shaper rates are later readjusted by the shaper control logic 82 using the method depicted by FIG. 5 based on changed conditions. In this regard, the DBA logic 101 may update the shaper rates periodically or according to some other algorithm in order to account for changing traffic load conditions.

Note that the shaper control logic 82 of each access module 52 similarly allocates a portion of the available downstream bandwidth to its local shapers 77 and then controls the shaper rates of its local shapers 77 accordingly. In allocating downstream bandwidth, the shaper control logic 82 of each access module 52 may use the same DBA algorithm so that the calculations are consistent from module-to-module. Thus, each access module 52 is aware of the amount of downstream bandwidth that is fairly allocated to each of the other access modules 52.

As described above, the access modules 52 control the shaper rates according to the DBA algorithm so that the total downstream data rate is limited to a value just below the total downstream capacity of the access node 22. That is, the total downstream data rate for the access node 22 is limited to a value just below the maximum total downstream data rate provided by the network connection 25 that is feeding the access node 22. Thus, to the extent that packets are lost due to congestion, such losses should occur in the queues 72 at the access node 22. Accordingly, the shaper control logic 82 is configured to control the shapers 77 so that the total downstream bandwidth of the access node 22 is allocated fairly among the dynamic shapers 77. Indeed, rather than allocating the downstream bandwidth among the dynamic shapers 77, the downstream bandwidth is allocated so that flows of the same class of service are allocated the same bandwidth and, hence, should have the same or similar data performance regardless of which access module 52 actually communicates the flow and regardless of which PON 39 actually carries the flow.

Note that, in the embodiments described above, the shaper control logic 82 for implementing a desired DBA algorithm is distributed across the access modules 52 such that each access module 52 determines its respective shaper rates. However, if desired, the shaper control logic 82 may be implemented at a central location, such as any one of the access modules 52 or the switch module 50. In such embodiment, the "centralized" shaper control logic 82 communicates with each access module 52 across the chassis backplane 58 via a control channel in order to determine the traffic load conditions at each access module 52. The shaper control logic 82 then determines the amount of downstream bandwidth allocated to each access module 52 so that the available downstream bandwidth is allocated in a fair manner across all of the access modules 52. The shaper control logic 82 then communicates with each access module 52 so that the shapers 77 are appropriately controlled to limit packet flow, as described above.

Figure 6:
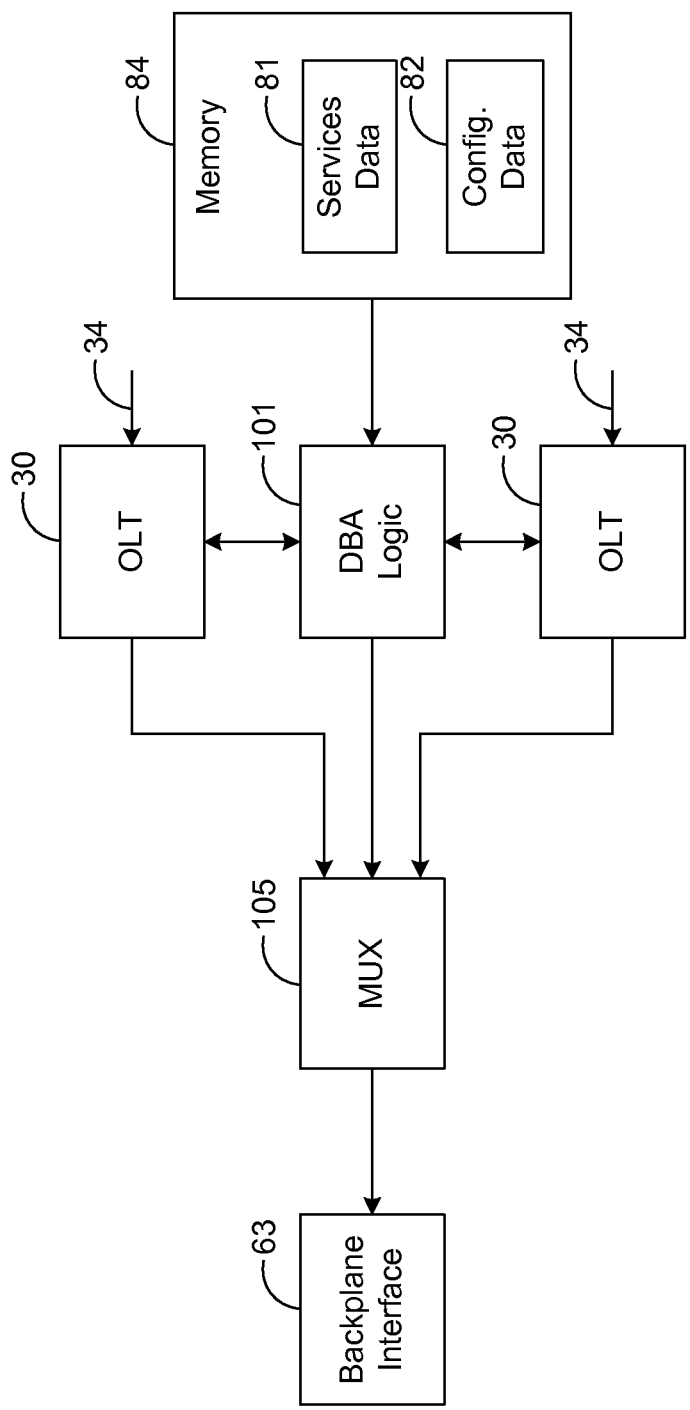
FIG. 6 is a block diagram illustrating an exemplary embodiment of an access module, such as depicted by FIG. 2, configured for upstream communication.

FIG. 6 depicts an exemplary embodiment of an access module 52 showing various components used to process upstream data. As shown by FIG. 6, each OLT 30 is coupled to a multiplexer (MUX) 105. When packets are received by an OLT 30 from an optical fiber 34, the OLT 30 converts the packets from the optical domain to the electrical domain and transmits the converted packets to the multiplexer 105, which multiplexes the data streams from multiple OLTs 30 to form a combined data stream for transmission across the chassis backplane 58 to the switch module 50. The switch module 50 combines data streams from multiple access modules 52 to form a combined data stream for transmission across the network connection 25 to the network 18 (FIG. 1). In one exemplary embodiment where the network connection 25 is an optical fiber, the switch module 50 also converts the combined data stream from the electrical domain to the optical domain so that the combined data stream is optically communicated via the network connection 25.

In the upstream direction, logic 101 (FIG. 6), referred to hereafter as "DBA logic," is configured to control bandwidth allocation. In one exemplary embodiment, the DBA logic 101 is implemented in hardware, such as a field programmable gate array (FPGA). In other embodiments, the DBA logic 101 may be implemented in hardware, software, firmware, or any combination thereof. As an example, the DBA logic 101 may be implemented in software that is stored in and executed by a processor (not shown).

As will be described in more detail below, the DBA logic 101 is configured to communicate with the OLTs 30 in order to control upstream bandwidth allocation. In this regard, via known techniques, each OLT 30 is configured to communicate with the ONUs 33 (FIG. 1) of the same PON 39 via a control channel in order to control upstream transmissions, such as when each ONU 33 is permitted to transmit. As will be described in more detail hereafter, the DBA logic 101 is configured to determine the amount of upstream bandwidth allocated to each service based on the upstream traffic load conditions across all of the access modules 52 and to then communicate control information with each OLT 30 for appropriately setting the upstream data rate of each service in order to achieve the desired bandwidth allocation. Based on such control information, each respective OLT 30 is then configured to communicate control information with the ONUs 33 so that the packet flows sent by the ONUs 33 are at the appropriate rates to implement the desired upstream bandwidth allocation.

In order to determine the appropriate bandwidth allocation for each service, the DBA logic 101 of a given access module 52 is configured to communicate with other access modules 52 across the chassis backplane 58 via a control channel, similar to the shaper control logic 82 described above. Through such communication, the DBA logic 101 is configured to receive control information indicating the current traffic load conditions in the upstream direction for all of the access modules 52. Note that such information may be obtained from the ONUs 33. That is, for a PON 39, the PON's OLT 30 may communicate with the ONUs 33 via a control channel of the PON 39 or otherwise in order to learn the upstream traffic load conditions at each ONU 33. Such upstream load conditions generally indicate the amount of data that each ONU 33 is attempting to communicate upstream. As an example, for each ONU 33, the load information may indicate the maximum of (1) a data rate that would be required to communicate all of the upstream data currently in the ONU 33 over a predefined time period and (2) a data rate measured or otherwise determined for the ONU 33 over a recent time interval. In other embodiments, other types of load information are possible.

If the ONUs 33 are not configured to communicate upstream traffic load information with the OLT 30, the OLT 30 may be configured to infer the current upstream load conditions based on the traffic flows and the control information that is passed between the OLT 30 and ONUs 33. Such information may be aggregated and limited, and is transmitted across the backplane 58 to the other access modules 52, such that the DBA logic 101 of each access modules 52 is aware of the traffic load conditions in the upstream direction for all of the access modules 52. Based on such load conditions, the DBA logic 101 fairly allocates the upstream bandwidth of the access node 22 across all access modules 52 such that services of the same class achieve the same or similar performance, as described above for the downstream direction. That is, rather than allocating the upstream bandwidth among the access modules 52 equally, each access module 52 is allocated a respective portion of the overall upstream bandwidth depending on its resources and the packet flows that are being communicated by the access module 52.

As shown by FIG. 6, the DBA logic 101 has access to the service data 81 and the configuration data 82 stored in memory 84. As indicated above, the configuration data 81 may indicate configuration information about the OLTs 30 and the PONs 39 serviced by the OLTs 30. For the upstream direction, the services data 81 may indicate various parameters, such as the guaranteed and peak rates, weight, and priority associated with each service. As indicated above for the downstream direction, the parameters may be indicated per flow. Alternatively, it is possible for the parameters to be indicated per flow locally but aggregated for other access modules 52, as described above for the downstream direction. Based on the traffic load conditions and the performance parameters, the DBA logic 101 determines how much upstream bandwidth is allocated to each access module 52. Based on the amount upstream bandwidth allocated to a given access module 52, as well as the module's configuration and performance metrics indicated by the services data 81 and the configuration data 82, the module's DBA logic 101 calculates a maximum upstream data rate for each packet flow such that the module's upstream bandwidth is fairly distributed across the module's packet flows.

After determining the upstream rate for each packet flow serviced by a given access module 52, the module's DBA logic 101 communicates the module's upstream rates to the module's OLTs 30, and these OLTs 30 then communicate with the ONUs 33 via PON control channels or otherwise in order to effectuate the determined rates. In particular, for a given PON 39, the PON's OLT 30 controls when each ONU 33 is permitted to transmit upstream such that the maximum upstream rate for a particular packet flow is limited according to the calculations performed by the DBA logic 101. Further, the DBA algorithm used to allocate upstream bandwidth ensures that the total upstream rate of the access node 22 is set just below the overall upstream capacity of the network connection 25 within a desired margin of error.

Note that there are a variety of techniques that can be used by the DBA logic 101 to control the upstream data rates. As an example, the DBA logic 101 may implement a time division multiplexed (TDM) architecture by allocating upstream time slots to the ONUs 33 such that each upstream time slot is allocated to only a single respective ONU 33. The number of time slots allocated to a given ONU 33 during a time period controls the amount of data that such ONU 33 is permitted to transmit upstream to the OLT 30 during that time period. In such example, for each respective ONU 33, the DBA logic 101 may define a media access plan (MAP) indicating which time slots are allocated to the ONU 33, and provide the MAP to the OLT 30 for communication of the MAP to the ONU 33 via a control channel.

Figure 8:
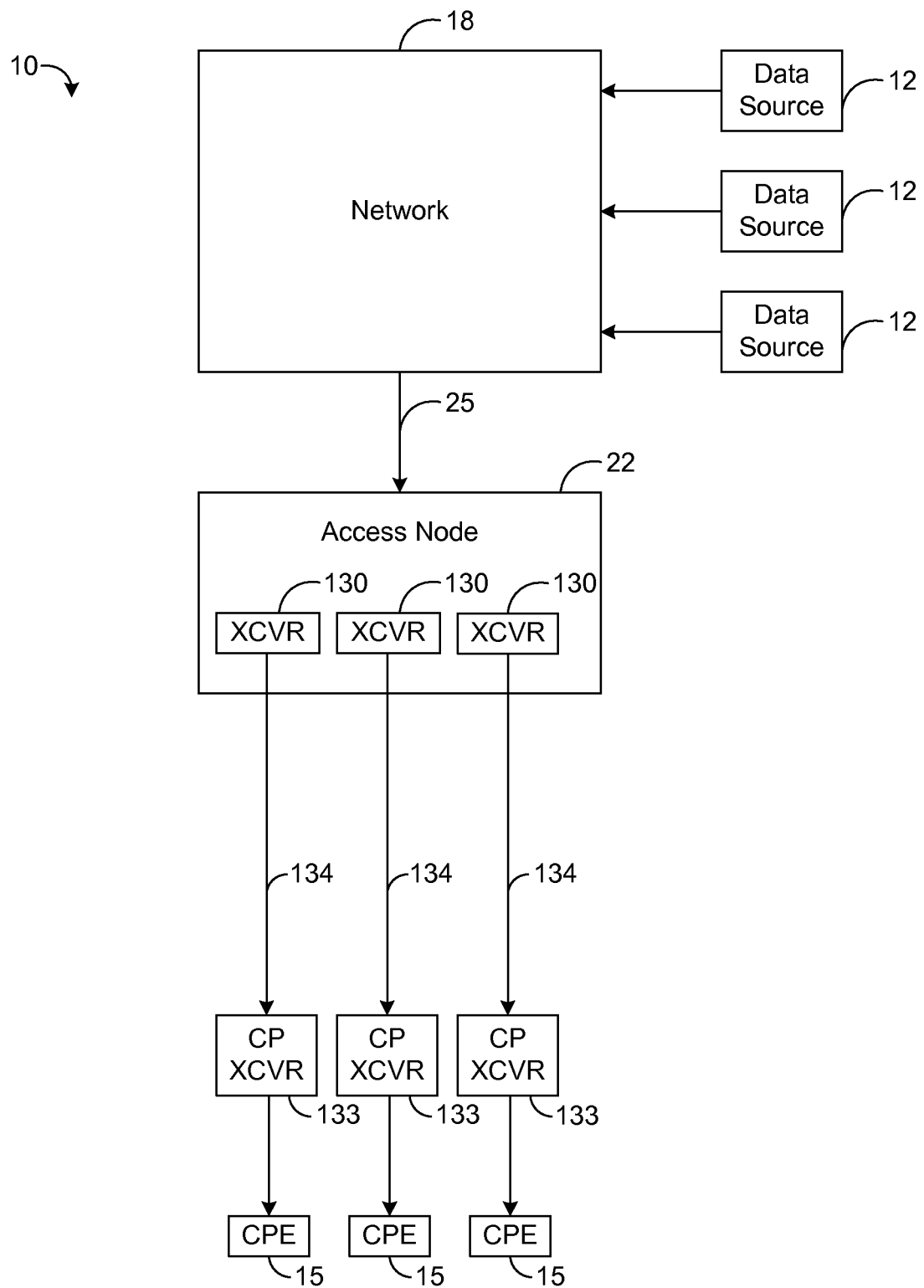
FIG. 8 is a block diagram illustrating an exemplary embodiment of a telecommunication system.

In other embodiments, such as is depicted by FIG. 8 and described further below, it is unnecessary for a shared medium to be used for communication between the access node 22 and CPE 15. In such an embodiment, a TDM architecture is unnecessary. Rather than transmitting a MAP to control upstream rates, the desired upstream data rates may be communicated via a control channel to transceivers that are configured for upstream communication, and such transceivers may use this information as appropriate to achieve the indicated rates. It is also possible for a TDM architecture to be used in conjunction with wavelength division multiplexing such that some wavelengths are shared in time and other wavelengths may be dedicated to a single customer. In other embodiments, yet other techniques for controlling the upstream data rates are possible.

An exemplary operation and use of the system 10 for establishing the upstream rates for an access module 52, referred to hereafter as "Access Module B," will now be described in more detail below with reference to FIG. 7.

Figure 7:
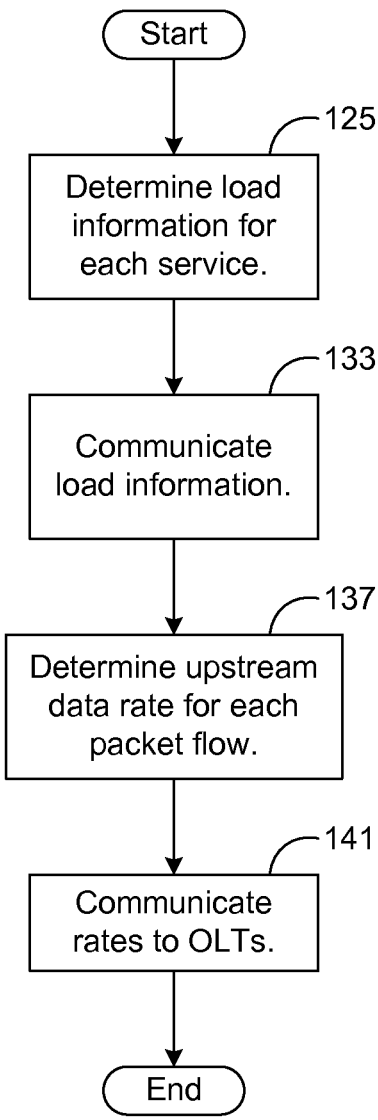
FIG. 7 is a flowchart illustrating an exemplary method for communicating control information with OLTs, such as is depicted by FIG. 6, in order to control upstream bandwidth in a desired manner.

As shown by block 125 of FIG. 7, load information for each service is determined. In this regard, for each PON 33, the PON's OLT 30 may be configured to communicate with the PON's ONUs 33 via a control channel of the PON 39 or otherwise to learn the current upstream load conditions, such as the amount of upstream data that is currently requested for transmission to the OLT 30 for each service or packet flow. The DBA logic 101 of Access Module B is configured to communicate with the OLTs 30 of Access Module B to learn the traffic load conditions in the upstream direction for the PONs 39 serviced by Access Module B. As an example, the DBA logic 101 may determine a value indicative of an amount of upstream data that is currently requested for each packet flow that is serviced by Access Module B. The DBA logic 101 of the other access modules 52 similarly determine the upstream load information of each packet flow serviced by these access modules.

In one exemplary embodiment, in order to reduce the amount of data communicated across the backplane 58, the DBA logic 101 of Access Module B aggregates the upstream load information of this Access Module B on a per-CoS basis, as described above for the downstream load information. Thus, for each class of service, the DBA logic 101 is configured to determine an aggregated value indicating the total amount of upstream data that is currently requested by Access Module B for the class of service. The DBA logic 101 transmits this aggregated load information to each of the other access modules 52 via a control channel of the backplane 58, as shown by block 133 of FIG. 7. The DBA logic 101 of the other access modules 52 similarly determine load information and distribute aggregated load information across the backplane 58 in block 133 so that each access module 52 is aware of the aggregated upstream load information of all of the access modules 52. Thus, the DBA logic 101 of Access Module B is aware of the upstream load information for each packet flow serviced by Access Module B, as well as load information that has been aggregated on a per-CoS basis for each of the other access modules 52. That is, for each of the other access modules 52, the DBA logic 101 is aware of the aggregated amount of upstream data that is currently requested for each class of service communicated by that access module 52.

Based on aggregated metrics, such as upstream load information and upstream parameters that have been aggregated on a per-Cos basis, the DBA logic 101 of Access Module B determines a fair allocation of the available upstream bandwidth of the access node 22 for each access module 52. Based on the upstream bandwidth allocated for Access Module B and more detailed metrics, such as upstream load information and upstream performance minimums indicated for each flow communicated by Access Module B, the DBA logic 101 of Access Module B then determines maximum upstream rates for its packet flows, as indicated by block 137 of FIG. 7, such that the aggregate upstream data rate through Access Module B is limited to that amount that has been allocated to it according to the DBA algorithm. Note that the upstream rate for any of the packet flows of Access Module B may be based on a variety of factors, such as the priorities or weights assigned to the packet flows (as indicated by the services data 81), the amount of data currently requested by such packet flows, the types of algorithms to be used for handling congestion (as indicated by services data 81), and other information typically used to select desired upstream rates.

After determining the upstream rates, the DBA logic 101 of Access Module B communicates the upstream rates to the OLTs 30 of the same Access Module B, as shown by block 141 of FIG. 7. The OLTs 30 then control the ONUs 33 so that the upstream data for each packet flow is limited according to the upstream rates calculated by the DBA logic 101. The upstream rates are so limited until the DBA logic 101 later updates the upstream rates in order to accommodate changing traffic load conditions by again performing the method depicted by FIG. 7. In this regard, the DBA logic 101 may update the upstream rates periodically or according to some other algorithm in order to account for changing traffic load conditions.

Note that the DBA logic 101 of each access module 52 similarly allocates a portion of the available upstream bandwidth to its access module 52 and then controls the rates of upstream data received by its local OLTs 30 accordingly. In allocating upstream bandwidth, the DBA logic 101 of each access module 52 may use the same DBA algorithm so that the calculations are consistent from module-to-module. Thus, each access module 52 may be aware of the amount of upstream bandwidth that is fairly allocated to each of the other access modules 52.

In any event, the access modules 52 control the upstream rates according to the DBA algorithm so that the total upstream data rate across all of the access modules 52 is limited to a value just below the total upstream capacity of the network connection 25. That is, the total upstream data rate for the access node 22 is as high as possible while ensuring that it remains, within a desired margin of error, just below the maximum total upstream data rate provided by the network connection 25.

As described above for the shaper control logic 82, it is unnecessary for the DBA logic 101 to be distributed across the access modules 52. For example, if desired, the DBA logic 101 may be implemented at a central location, such as any one of the access modules 52 or the switch module 50.

In such embodiment, the "centralized" DBA logic 101 communicates with each access module 52 across the chassis backplane 58 via a control channel in order to determine the load conditions at each access module 52. The DBA logic 101 then determines the amount of upstream bandwidth allocated to each access module 52 so that the available bandwidth is allocated in a fair manner across all of the access modules 52. The DBA logic 101 then communicates with each access module 52 so that the OLTs 30 are informed how to limit upstream transmissions.

In addition, in various embodiments described above, the access modules 52 are described as sharing aggregated load information and using aggregated performance metrics to allocate upstream and downstream bandwidth. Using aggregated load information and performance metrics generally simplifies calculations and helps to reduce the amount of data that is communicated cross the backplane 58. However, it should be emphasized that it is unnecessary for the load information or the performance metrics to be aggregated in any of the embodiments described herein. As an example, more detailed information (e.g., load information on a per-service basis) may be shared across the backplane 58 and used to allocate downstream or upstream bandwidth. Other modifications and changes would be apparent to a person of ordinary skill upon reading this disclosure.

It should be further noted that various techniques may be used for communicating between the access node 22 and the CPE 15. As an example, FIG. 8 depicts an exemplary embodiment of a system 10 in which the access node 22 has electrical transceivers (XCVR) 130. In this regard, each electrical transceiver 130 is coupled to a customer premises transceiver (CP XCVR) 133 via a respective communication connection 134. In one exemplary embodiment, the transceivers 130, 133 communicate via DSL (e.g., asymmetric DSL (ADSL), high-bit-rate DSL (HDSL), very-high-bit-rate DSL (VDSL), VDSL2, or any of the other flavors of DSL) or other known protocol. If desired, multiple communication connections 134 may be aggregated (e.g., bonded) in order to define a single virtual channel, as known in the art. The access node 22 in the embodiment depicted by FIG. 8 operates essentially the same in the downstream and upstream directions as the access node 22 depicted by FIG. 1 except that electrical signals rather than optical signals are communicated between the access node 22 and the equipment at the customer premises.

Now, therefore, the following is claimed:

1. An access node for use in a telecommunication system, comprising:
a first access module having a plurality of optical line terminals (OLTs), including at least a first OLT and a second OLT, residing on a first line card, the first OLT coupled to a first optical network unit (ONU) by a first network, the first OLT coupled to the first network by a first path and configured to receive a first upstream packet flow from the first ONU via the first network and the first path, wherein the first OLT is configured to determine upstream traffic load conditions for the first OLT by communicating with at least the first ONU via a first control channel, wherein the second OLT is coupled to a second ONU by a second network, the second OLT coupled to the second network by a second path separate from the first path, wherein the second OLT is configured to receive a second upstream packet flow from the second ONU via the second network and the second path and to determine upstream traffic load conditions for the second OLT by communicating with at least the second ONU via a second control channel, wherein the first access module is configured aggregate upstream traffic load information for each of the plurality of OLTs on a per class-of-service basis based on at least the upstream traffic load conditions for the first OLT and the upstream traffic load conditions for the second OLT, and wherein the aggregated upstream traffic load information is indicative of upstream traffic load conditions for the first access module;
a second access module having a third OLT residing on a second line card, the third OLT coupled to a third ONU by a third network, the third OLT coupled to the third network by a third path separate from the first path and the second path, the third OLT configured to receive a third upstream packet flow from the third ONU via the third network and the third path, wherein the access node is configured to multiplex the first upstream packet flow, the second upstream packet flow, and the third upstream packet flow, thereby forming a data stream, and to transmit the data stream across a network connection to a network, and wherein the third OLT is configured to determine upstream traffic load conditions for the third OLT by communicating with at least the third ONU via a third control channel and to determine, based on the upstream traffic load conditions for the third OLT, second upstream traffic load information indicative of upstream traffic load conditions for the second access module; and
dynamic bandwidth allocation (DBA) logic configured to receive (a) the aggregated upstream traffic load information from the first access module, and (b) the second upstream traffic load information from the second access module, the DBA logic further configured to control an upstream data rate of at least the first ONU based on the first aggregated upstream traffic load information and the second upstream traffic load information.

2. The access node of claim 1, wherein the DBA logic resides on the first line card.

3. The access node of claim 1, further comprising:
a chassis having a plurality of slots and a backplane, wherein the first line card is inserted into a first slot of the chassis and is coupled to the backplane, wherein the second line card is inserted into a second slot of the chassis different from the first slot and is coupled to the backplane, and wherein the second access module is configured to transmit the second upstream traffic load information across the backplane to the DBA logic.

4. The access node of claim 1, wherein the aggregated upstream traffic load information is based on an amount of data stored in or passing through the first ONU, and wherein the second upstream traffic load information is based on an amount of data stored in or passing through the third ONU.

5. The access node of claim 1, wherein the first OLT is coupled to an optical fiber, and wherein the first upstream packet flow is carried by an optical signal received by the first OLT from the optical fiber.

6. A telecommunication system, comprising:
a plurality of optical network units (ONUs), including at least a first ONU, a second ONU, and a third ONU;
a network connection; and
an access node having a plurality of access modules coupled to a backplane of the chassis, wherein the access node is coupled to the network connection and is configured to multiplex upstream packet flows received by the plurality of access modules from the plurality of ONUs thereby providing a data stream for transmission across the network connection to a network, and wherein the plurality of access modules include at least a first access module and a second access module;

the first access module having a plurality of optical line terminals (OLTs), including at least a first OLT and a second OLT, residing on a first line card inserted into a respective slot of the chassis, the first OLT coupled to the first ONU by a first network through a first path, wherein the first OLT is configured to determine upstream traffic load conditions for the first OLT by communicating with at least the first ONU via a first control channel, wherein the second OLT is coupled to the second ONU by a second network through a second path separate from the first path, wherein the second OLT is configured to receive a second upstream packet flow from the second ONU via the second network and the second path and to determine upstream traffic load conditions for the second OLT by communicating with at least the second ONU via a second control channel, wherein the first access module is configured aggregate upstream traffic load information for each of the plurality of OLTs on a per class-of-service basis based on at least the upstream traffic load conditions for the first OLT and the upstream traffic load conditions for the second OLT, and wherein the aggregated upstream traffic load information is indicative of upstream traffic load conditions for the first access module; and the second access module having a third OLT residing on a second line card inserted into a respective slot of the chassis, the second OLT coupled to the third ONU by a third network through a third path separate from the first path and the second path, the third OLT configured to receive a third upstream packet flow from the third ONU via the third network and the third path, wherein the third OLT is configured to determine upstream traffic load conditions for the third OLT by communicating with at least the third ONU via a third control channel, and wherein the second access module is configured to determine, based on the upstream traffic load conditions for the third OLT, second upstream traffic load information indicative of upstream traffic load conditions for the second access module, wherein the access node has dynamic bandwidth allocation (DBA) logic configured to receive (a) the aggregated upstream traffic load information from the first access module via the backplane and (b) the second upstream traffic load information from the second access module, and wherein the DBA logic is configured to control upstream data rates for the plurality of access modules based on the aggregated upstream traffic load information and the second upstream traffic load information such that an upstream data rate of a data signal received by one of the plurality of OLTs is based on the aggregated upstream traffic load information and the second upstream traffic load information.

7. The system of claim 6, wherein each of the access modules is coupled to an optical fiber and is configured to receive a respective one of the packet flows from the optical fiber.

8. A method for use in a telecommunication system, comprising:

receiving, at a first access module of an access node, a first upstream packet flow transmitted by a first optical network unit (ONU) to a first optical line terminal (OLT) of the first access module residing on a first line card, wherein the first upstream packet flow is transmitted to the first OLT by a first network coupled to the first OLT by a first path;

determining with the first OLT upstream traffic load conditions for the first OLT by communicating at least with the first ONU via a first control channel;

receiving, at the first access module of the access node, a second upstream packet flow transmitted by a second ONU to a second OLT of the first access module residing on the first line card, wherein the second upstream packet flow is transmitted to the second OLT by a second network coupled to the second OLT by a second path separate from the first path;

determining with the second OLT upstream traffic load conditions for the second OLT by communicating at least with the second ONU via a second control channel;

aggregating with the first access module upstream traffic load information for at least each of the first OLT and the second OLT on a per class-of-service basis based on at least the upstream traffic load conditions for the first OLT and the upstream traffic load conditions for the second OLT, wherein the aggregated upstream traffic load information is indicative of upstream traffic load conditions for the first access module;

receiving, at a second access module of the access node, a third upstream packet flow transmitted by a third ONU to a third OLT of the second access module residing on a second line card, wherein the third upstream packet flow is transmitted to the third OLT by a third network coupled to the third OLT by a third path separate from the first path and the second path;

determining with the third OLT upstream traffic load conditions for the third OLT by communicating at least with the third ONU via a third control channel;

determining, with the second access module based on the upstream traffic load conditions for the third OLT, second upstream traffic load information indicative of upstream traffic load conditions for the second access module;

multiplexing the packet flows at the access node thereby forming a data stream;

transmitting the data stream to a network across a network connection coupled to the access node;

receiving the aggregated upstream traffic load information from the first access module and the second upstream traffic load information from the second access module; and controlling an upstream transmission rate of at least the first ONU based on the aggregated upstream traffic load information and the second upstream traffic load information such that the upstream transmission rate is based on the upstream traffic load conditions for the first access module and the upstream traffic load conditions for the second access module.

9. The method of claim 8, wherein the aggregated upstream traffic load information is based on an amount of data stored in or passing through the first ONU, and wherein the second upstream traffic load information is based on an amount of data stored in or passing through the third ONU.

10. The method of claim 8, wherein the first access module is inserted into a slot of a chassis, and wherein the second access module is inserted into a slot of the chassis.

11. The method of claim 10, further comprising transmitting the second upstream traffic load information from the second access module across a backplane of the chassis, wherein the first access module and the second access module are coupled to the backplane.

12. The access node of claim 1, wherein the DBA logic is configured to control the upstream data rates of a plurality of ONUs, including at least the first ONU, the second ONU, and the third ONU, based on the aggregated upstream traffic load information and the second upstream traffic load information to ensure that a total upstream data rate of the plurality of ONUs is less than a total upstream capacity for the network connection thereby preventing uncontrolled packet loss at the access node for upstream flows communicated across the network connection.

13. The access node of claim 1, wherein the DBA logic is configured to control the upstream data rate of the first ONU on a class-of-service basis across the first line card and the second line card such that a data rate for the first upstream packet flow corresponds to a data rate for the third upstream packet flow if the first upstream packet flow and the third upstream packet flow are in the same class of service.

14. The access node of claim 1, wherein the first upstream packet flow is in a first class of service, wherein the second upstream packet flow is in a second class of service different than the first class of service, wherein the third upstream packet flow is in the first class of service, and wherein the DBA logic is further configured to allocate, based on the aggregated upstream traffic load information and the second upstream traffic load information, upstream bandwidth across at least the first access module and the second access module on a class-of-service basis, thereby controlling a data rate for the first upstream packet flow based on the aggregated upstream traffic load information and the second upstream traffic load information such that the data rate for the first upstream packet flow in the first class of service (1) corresponds to a data rate for the third upstream packet flow in the first class of service and (2) is different than a data rate for the second upstream packet flow in the second class of service.

\* \* \* \* \*